Aug. 18, 1931.  D. G. MACKENZIE  1,819,716
POWER TRANSMISSION
Filed Feb. 8, 1926   3 Sheets-Sheet 1

Inventor
D. G. MacKenzie
by: C. J. Fetherstonhaugh
Attorney.

Aug. 18, 1931.  D. G. MACKENZIE  1,819,716
POWER TRANSMISSION
Filed Feb. 8, 1926   3 Sheets-Sheet 2

Aug. 18, 1931.   D. G. MACKENZIE   1,819,716
POWER TRANSMISSION
Filed Feb. 8, 1926   3 Sheets-Sheet 3

Inventor
D. G. MacKenzie
by: E. J. Fetherstonhaugh
Attorney.

Patented Aug. 18, 1931

1,819,716

UNITED STATES PATENT OFFICE

DONALD GORDON MACKENZIE, OF MONTREAL, QUEBEC, CANADA, ASSIGNOR TO DONMAC PRODUCTS CORPORATION, OF NEW YORK, N. Y., A CORPORATION OF DELAWARE

POWER TRANSMISSION

Application filed February 8, 1926. Serial No. 86,704.

The invention relates to a power transmission as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to insure during running conditions a high degree of efficiency at a comparatively low rated horse power and in connection with this it may be said that the margin required to overcome the mechanical problem of applying motion to a still shaft is taken care of by the elmination of the friction clutch and the substitution of a fluid force applied definitely and slowly, which decreases in magnitude as the speed of the shaft increases until the ratio of speed to force in the driven shaft is the same as that of the driving shaft; to establish in starting a vehicle a smooth and gradual application and avoid any slipping during preliminary operations; to do away with gear changes in finding the different speeds in motor vehicles; to eliminate the deleterious results of the starting torque on the shaft under known conditions and thereby avoid the strains on the contiguous engine parts and generally to facilitate the operation of motor vehicles at high efficiency and provide for heavy haulage and starting conditions.

In the drawings, Figure 1 is a longitudinal sectional view showing the fluid transmission.

Like numerals of reference indicate corresponding parts in the various figures.

Figure 1:
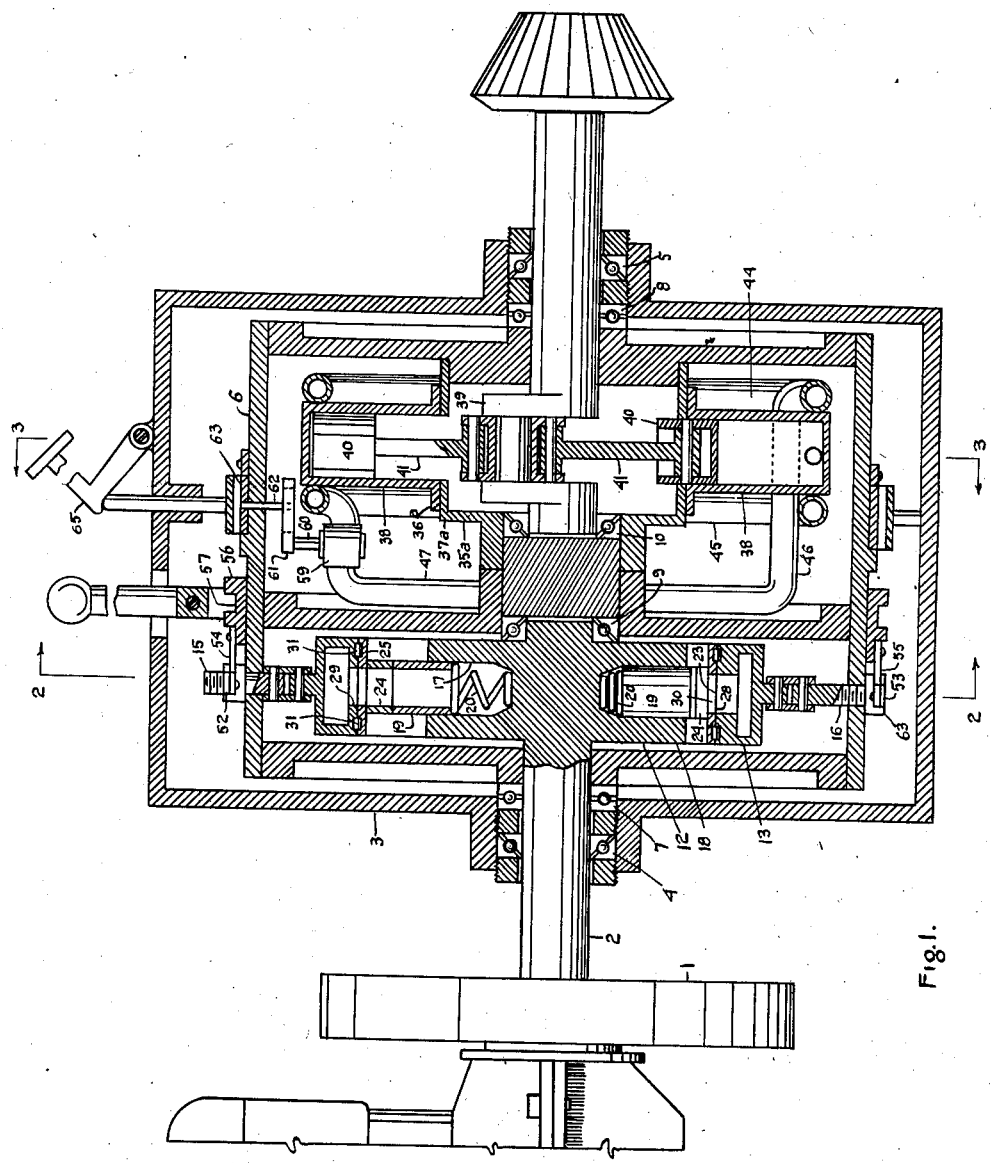
Figure 2:
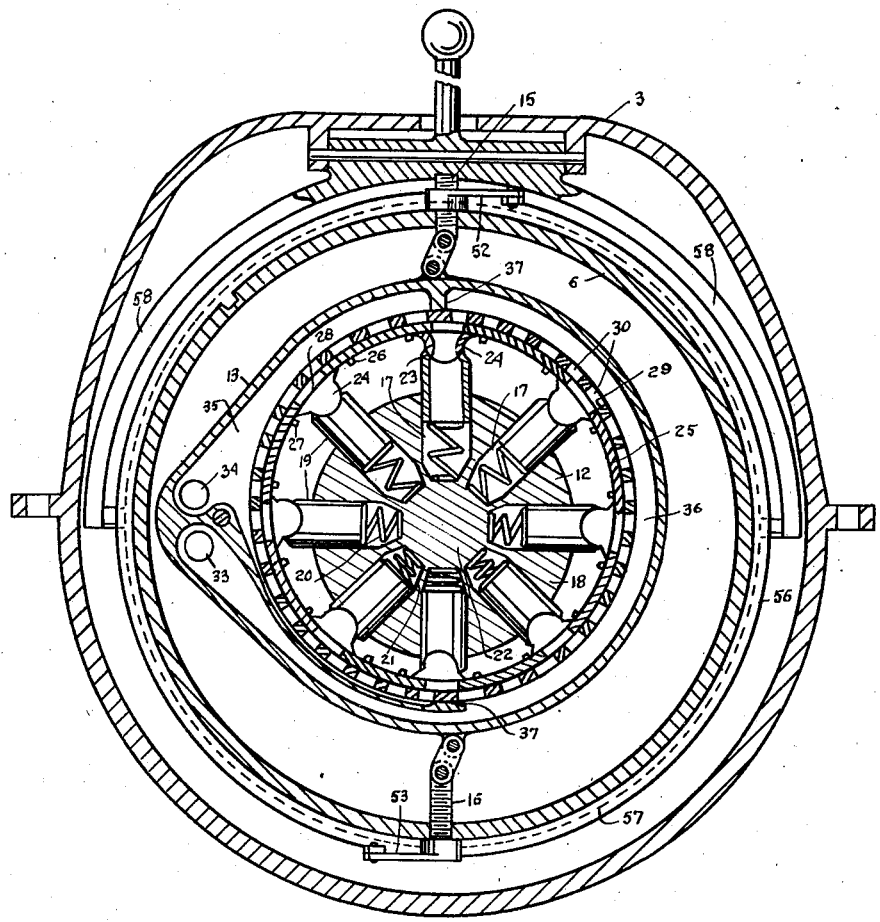
Figure 2 is a cross sectional view on the line 2—2 in Figure 1.
Figure 3:
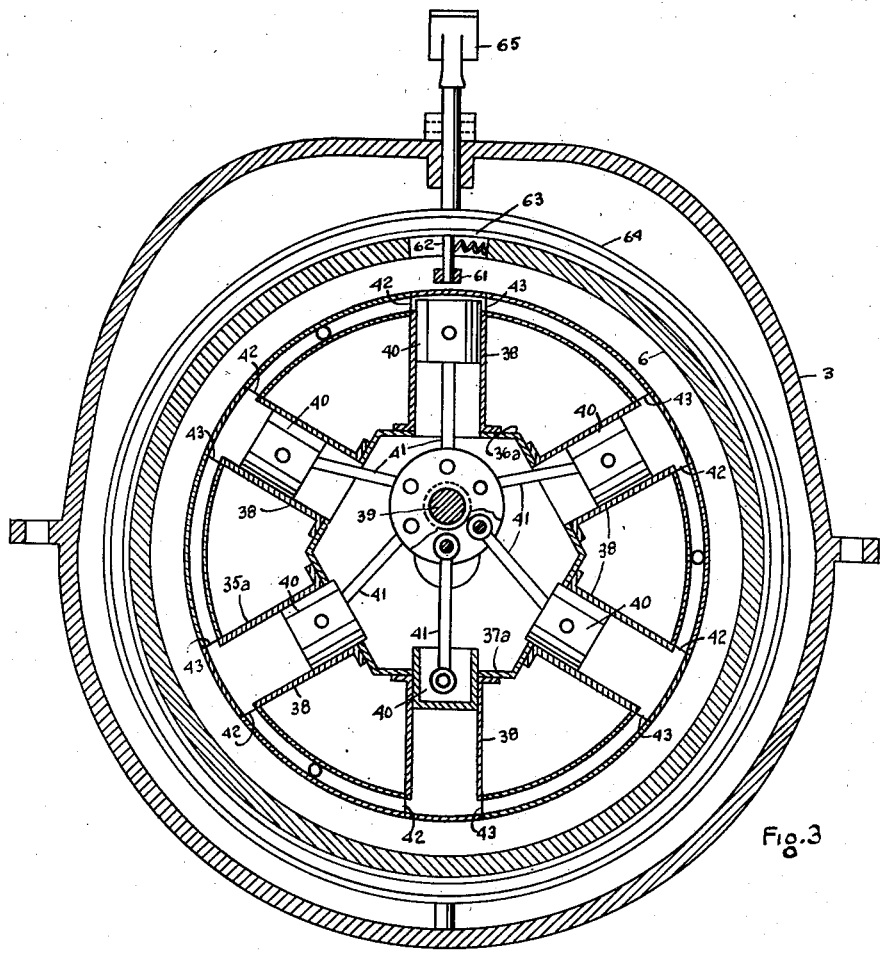
Figure 3 is a cross sectional view on the line 3—3 in Figure 1.

Referring to the drawings, the prime mover 1 is preferably an internal combustion engine connected through its shaft 2 with the fixed casing 3 having the shaft bearings 4 and 5 and enclosing the inner rotatable frame or casing 6 in which the bearings 7 and 8 are formed at the ends and the bearings 9 and 10 in the middle. The rotary pump 12 is contained within the swinging casing 13, pivoted in the casing 6 and adjustably held at the upper and lower ends by the adjusting screws 15 and 16.

The radial recesses 17 in the rotor 18 of the pump contain the extension wall or plungers 19 mounted at their inner ends on the tapered spiral springs 20, the latter abutting the shaft surfaces in the spring recesses 21 in the periphery of the pump shaft 22. The plungers 19 converge at their upper ends to the oil inlet and outlet 23 into which the arcual rubbing discharge heads 24 extend and form therewith a flexible joint at each plunger opening. The ring 25 encircles the rotor 18 and engages the several heads 24 between the stops 26 and 27, arranged in pairs, and directly in register with the ports 28. The non-rotative casing 29 encircles the ring 25 and is formed with registering ports 30 and is fixedly secured within the swinging casing 13 so that the latter may carry both the casings 25 and 29 to and from the rotor 18 in either direction upwardly or downwardly. The rollers 31 facilitate the rotation of the casing 25 within the shell or casing 29.

In operation the pump 12 is driven by the motor shaft 2 and the rotor 18 carries with it in rotation the ring 25, and the oil flows into the plungers 19 or extension walls into the plunger recess 17 on the one side of the rotor and on the other side flows out of the extension walls and plunger recesses. The oil circuit formed by the tubular passages leads from the pump outlet 33 and flows back to the pump inlet 34 and on either side communicates with the ports 30 in the stationary casing 29, which in turn register with the ports 28. The swinging casing 13 is divided into the inlet and outlet chambers 35 and 36 respectively by the partition 37, The screw adjustment of the swinging casing 13 produces a variable pump by having a fixed rotor and movable pump casings for starting or lengthening the strokes of the plungers 19, thereby regulating the speed in the flow of the oil in its tubular passages.

The driven motor 35a is formed of the casing 36a comprising a central crank chamber 37a from which the cylinders 38 project at proper intervals to complete a symmetrical casing. The crank shaft 39 extends into and through the crank chamber 37 and the pistons 40 are joined in sets by the connecting rods 41 to the crank or cranks as the case may be, as well known practice is followed and nothing claimed as novel regarding the construction of the motor and only sufficient is shown and described to give a clear understanding of the invention.

The cylinders 38 have inlet and exhaust ports 42 and 43, said ports 42 being connected to the inlet manifold 44, and said ports 43 being connected to the exhaust manifold 45.

Figure 4:
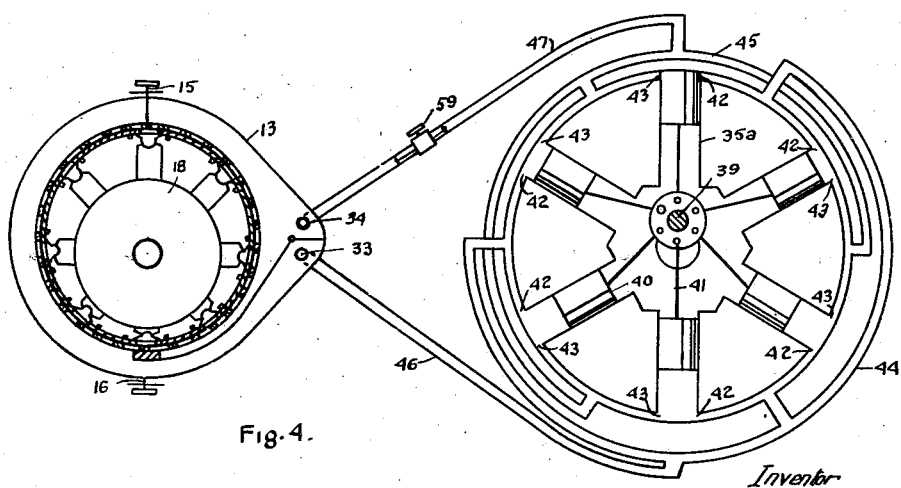
Figure 4 is a diagrammatic view showing the connections between the pump and motor.

The manifold 44 is connected to the pump outlet 33 by the tubular passage 46 and the manifold 45 is connected to the pump inlet 34 by the passage shown diagrammatically and indicated by the numeral 47 in Figure 4.

The adjust screws 15 and 16 for determining the positions of the swinging casing 13 and pump casings 25 and 29 in relation to the pump rotor 18, are operated by means of the cranks 52 and 53 respectively. The cranks 52 and 53 are turned by the fingers 54 and 55 respectively and these fingers are moved by the ring 56 sliding on the offset ends of the operating levers 58, the latter being pivotally secured in the outer casing 3. This description of the operation of the adjusting screws is merely given, so as to show an operating machine and therefore is likely to be materially changed to meet surrounding requirements.

The screws 15 and 16 are rotatively connected to the swinging casing 13 and are threaded through the wall of the casing 6 and these screws beyond the wall carry the cranks 52 and 53 respectively. The movement of these screws is entirely dependent on the required lever action necessary to reduce the speed of the flow of oil and therefore reduce the speed of the vehicle or other machinery. To bring the pump casings to the central or concentric position with the rotor secures the neutral or non-operative position of the pump while otherwise the position of the pump casings is made to agree with the chosen direction of the flow of oil to the motor.

The valve 59 is introduced into the passage 47 and has a port coinciding therewith. Its stem 60 projects outwardly and is surmounted by a crank 61, which is engaged by a finger 62 from the brake ring 63. The brake ring 63 is engaged by the brake band 64 and slips in a slot in the casing 6 sufficiently to open the valve which is returned to its closed position by a spring.

The operation of this valve is very briefly described, as it is only a suggested means for operating and may or may not be used in whole or in part. A conventional pedal 65 is shown and a conventional band 64, but any form of brake mechanism may be used.

The reversing of the motor may be done by crossed tubular paths and valve mechanism, but only one method of effecting the reverse is herein shown, and that is diverting the stream oil from the pump outlet, so that it passes into the exhaust manifold instead of the inlet manifold of the motor.

In the operation of this invention, the prime mover is customarily operated at a constant speed though this may be varied particularly after high speed has been reached, therefore during the initial movements of a vehicle, the engine or prime mover is operating at a speed that will avoid stalling and yet have no direct influence on the motion of the vehicle, in its earlier stages the drive being entirely through the transmission and driven motor which depends on the pump for its feed.

The engine shaft and the pump shaft may run at even speeds and, will no doubt do so in most installations and it is the pump that controls the variable and reverse motions of the vehicle in this form of the invention, as the rotor of the pump is stationary and maintains a constant centre and even rotation, however the pump casing is adjustable as explained and by operating the swinging casing through the adjusting screws the length of the pump plunger strokes are regulated and this in turn determines the volume of the impelling force of oil, which means that the speed is varied at each change of the relative positions. To overcome the inertia of the still shaft and the movement of the weight depending upon the turning of said shaft for motion, the screw adjustment is made by means of suitable lever mechanism, affecting the pump action as explained. The fluid flowing in the pump and motor casings and tubular passages passes into the plunger recesses according to the stroke of the plungers, consequently the feed to the motor is proportionately made in greater or lesser quantities, thus in the rotor the minimum of motion is obtained with the maximum of power behind it. The speed can be increased gradually by adjusting the screws and lengthening the plungers on the inlet side and thereby afford the greatest comfort in the driving of vehicles and great haulage advantages. Up to running speed the oil drive is used and in discontinuing it the fluid is stopped by a valve and the casing 6 allowed to turn, thus increasing the momentum in a similar action to the ordinary fly wheel of an engine.

To slow up, the oil fluid is again brought into operation and the casing 6 retarded and stopped and the same screw adjustment brought into action for the slower speeds.

In reversing rotation of the driven shaft the reversing valves are operated to change the direction of the flow and positions of the pump casings made to agree, so that the fluid is driven to the exhaust of the secondary motor, which thus becomes the inlet and likewise the inlet manifold becomes the exhaust manifold.

What I claim is:—

1. In a device of the kind described, a pump comprising a rotor having plunger wells, tubular plungers in said wells, springs in said wells holding said plungers to their outer positions, a ring having ports and mounted on said plungers and rotating therewith, and a non-rotative casing eccentrically supported in relation to said rotor and having ports registering with the aforesaid ports and connected with inlet and outlet passages.

2. In a device of the kind described, a pump comprising a rotor having plunger wells, plungers open at both ends and springs pressing on the inner ends within said wells, a ring having ports and encircling said plungers, plunger heads forming discharge mouths and engaging said ring and a non-rotative casing forming a bearing for said ring and eccentrically mounted in relation to said rotor and having ports registering with the aforesaid ports and connected with inlet and outlet passages.

3. In a device of the kind described, a pump comprising a rotor having radial recesses forming plunger wells, a rubbing ring eccentric to said rotor in operation and having ports at intervals, tubular plungers spring mounted in said wells and registering with said ports in rotation and a stationary casing enclosing said ring, said rotor and plungers and connected with inlet and discharge passages in a circulatory system.

4. In a device of the kind described, a pump comprising a rotor having plunger wells and open spring pressed plungers operating therein, a rotative ring having ports, discharge heads communicating and travelling with said plungers and wells and said ring and rubbing the latter, a non-rotative casing encircling said ring and having ports communicating through said ring with said plungers and plunger wells, and an enclosing casing having inlet and outlet passages communicating with said ports and maintaining said non-rotative casing in a chosen eccentric position in relation to said rotor.

5. In a device of the kind described, a pump comprising a rotor having plunger wells and open spring pressed plungers operating therein, a rotative ring having ports, discharge heads communicating with said plungers and wells and rubbing said ring and rotating therewith, a non-rotative casing encircling said ring, an enclosing casing swinging from a pivot mounting and partitioned to form inlet and outlet passages connected with said ports and means within said enclosing casing for rigidly supporting and carrying the aforesaid non-rotative casing to its adjusted position eccentrically situated in relation to the said rotor, and a stationary outer casing.

Signed at Montreal, Canada, this 16th day of November, 1925.

DONALD GORDON MACKENZIE.